United States Patent
Hu et al.

(10) Patent No.: US 12,281,265 B2
(45) Date of Patent: Apr. 22, 2025

(54) FILTER AIDS FOR NON-AQUEOUS LIQUIDS

(71) Applicant: IMERYS USA, INC., Roswell, GA (US)

(72) Inventors: Li-Chih Hu, Sacramento, CA (US); David Gittins, San Jose, CA (US); Neal Williams, New Albany, IN (US); Chris Abrams, Roswell, GA (US)

(73) Assignee: Imerys USA, Inc., Roswell, GA (US)

( * ) Notice: Subject to any disclaimer, the term of this patent is extended or adjusted under 35 U.S.C. 154(b) by 278 days.

(21) Appl. No.: 17/786,334

(22) PCT Filed: Dec. 18, 2020

(86) PCT No.: PCT/US2020/065980
§ 371 (c)(1),
(2) Date: Jun. 16, 2022

(87) PCT Pub. No.: WO2021/127413
PCT Pub. Date: Jun. 24, 2021

(65) Prior Publication Data
US 2023/0037514 A1 Feb. 9, 2023

Related U.S. Application Data

(60) Provisional application No. 62/951,795, filed on Dec. 20, 2019.

(51) Int. Cl.
*C10G 31/09* (2006.01)
*B01J 20/10* (2006.01)
(Continued)

(52) U.S. Cl.
CPC ............ *C10G 31/09* (2013.01); *B01J 20/106* (2013.01); *B01J 20/14* (2013.01);
(Continued)

(58) Field of Classification Search
CPC ............ C10G 31/09; C10G 2300/1055; C10G 2300/201; B01J 20/106; B01J 20/14;
(Continued)

(56) References Cited

U.S. PATENT DOCUMENTS

2009/0065435 A1* 3/2009 Li ........................... C02F 1/281
210/660
2009/0199460 A1 8/2009 Munson et al.
(Continued)

FOREIGN PATENT DOCUMENTS

| CN | 1097350 A | 1/1995 | |
|---|---|---|---|
| CN | 101029251 A | 9/2007 | |
| CN | 109943600 A | 6/2019 | |
| WO | WO-2016137860 A1 * | 9/2016 | ............... A23D 9/02 |
| WO | WO-2019-118819 A1 | 6/2019 | |

OTHER PUBLICATIONS

International Search Report and Written Opinion for International Application PCT/US2018/065980, dated Mar. 8, 2021.
(Continued)

*Primary Examiner* — Randy Boyer
*Assistant Examiner* — Juan C Valencia
(74) *Attorney, Agent, or Firm* — Finnegan, Henderson Farabow & Garrett & Dunner, LLP (57) ABSTRACT

A method for filtering a non aqueous liquid such as a biodiesel to reduce the levels of sterol glucosides and/or saturated monoglycerides.

17 Claims, 1 Drawing Sheet

(51) Int. Cl.
*B01J 20/14* (2006.01)
*B01J 20/28* (2006.01)

(52) U.S. Cl.
CPC .............................. *B01J 20/28004* (2013.01); *C10G 2300/1055* (2013.01); *C10G 2300/201* (2013.01)

(58) Field of Classification Search
CPC ....................... B01J 20/28004; B01J 2220/42; B01J 20/103; B01J 20/24; B01D 2239/1241; B01D 37/02; B01D 39/04; B01D 39/06; Y02E 50/10
See application file for complete search history.

(56) References Cited

U.S. PATENT DOCUMENTS

| | | |
|---|---|---|
| 2009/0300972 A1 | 12/2009 | Jalalpoor et al. |
| 2018/0185816 A1 | 7/2018 | Fleming et al. |
| 2018/0236383 A1 | 8/2018 | Brimingham et al. |
| 2019/0039043 A1 | 2/2019 | Taniguchi et al. |
| 2019/0168145 A1 | 6/2019 | Wang |

OTHER PUBLICATIONS

Chen et al., "Study on low temperature flowing properties of palm oil biodiesel," (2008).

* cited by examiner

FILTER AIDS FOR NON-AQUEOUS LIQUIDS

This application is a U.S. national phase entry under 35 U.S.C. § 371 from PCT International Application No. PCT/US2020/065980, filed Dec. 18, 2020 which claims the benefit of priority of U.S. Provisional Patent Application No. 62/951,795, filed Dec. 20, 2019, from both of which this application claims priority and both of which are incorporated herein by reference.

FIELD OF THE INVENTION

The present invention relates to methods for filtering non aqueous liquids. In particular, the present invention relates to methods for filtering non aqueous liquids such as biodiesel.

BACKGROUND OF THE INVENTION

Identifying and using economically viable renewable energy has been a policy goal of governments around the world. One source of renewable fuel that has been promoted and developed is biodiesel. Biodiesel is attractive because it has similar properties to petroleum-based diesel fuel. Biodiesel may be a desirable energy alternative to wind-, solar-, and ethanol-derived energy because the energy content to capital requirement ratio is close to a break-even point, depending upon the price of petroleum-derived energy.

Biodiesel is a form of purified alkyl esters of fatty acids generally referred to as fatty acid alkyl esters (FAAEs). Production of these FAAEs is achieved by the transesterification of animal or vegetable fats or oils or the esterification of fatty acids, including free fatty acids (FFAs) found in degraded fat or oil. The process involves reacting triacylglycerol with an alcohol, typically methanol, in the presence of a catalyst (such as sodium or potassium hydroxide or methoxide), resulting in a reaction referred to as "transesterification." Alternatively, fatty acids, including those found in degraded fat or oil containing high levels of FFAs, typically referred to as "yellow grease," "brown grease," or "trap grease," are reacted with an alcohol, typically methanol, in the presence of an acid, resulting in a reaction referred to as "esterification." When using degraded fat or oil as a raw material, esterification is performed prior to transesterification in order to promote conversion of fatty acids into FAAEs. Unreacted methanol from both processes is then removed by flash evaporation so that it can be reused for subsequent esterification and/or transesterification reaction(s).

Biodiesel can also be derived from triacylglycerides (also called "triglycerides"), which may be obtained from both plant sources and animal fat sources, such as, for example, soybean oil, rapeseed oil, palm oil, coconut oil, corn oil, cottonseed oil, mustard oil, used cooking oils, float grease from wastewater treatment plants, animal fats, such as beef tallow and pork lard, soapstock, crude oils, "yellow grease" (i.e., animal or vegetable oils and fats that have been used or generated as a result of the preparation of food by a restaurant or other food establishment that prepares or cooks food for human consumption with a free fatty acid content of less than 15%), and "white grease," which is rendered fat, derived primarily from pork, and/or other animal fats having a maximum free fatty acid content of 4%.

However, simply performing the esterification and/or transesterification of fatty acids is not enough to produce a usable biodiesel fuel. FAAEs contain impurities that can crystallize, foul engines, and cause numerous problems for the user. As a result, regulations have been developed to address the quality assurance needs of the consumer. Strict standards for commercial biodiesel have been developed by the governments of most countries, including the U.S. Government in ASTM International's ASTM D6751 and the European Union by the European Committee for Standardization in EN 14214.

As a result of the above-described transesterification reaction, two products are produced: fatty acid alkyl esters (FAAEs) (typically Fatty Acid Methyl Esters (FAMEs)) and glycerin. The glycerin portion is separated from the FAAE portion, either by centrifugation or gravity settling, and the resulting FAAEs are often referred to as "crude biodiesel." The crude biodiesel portion consists of FAAEs containing impurities that must be removed before it can be commercially marketed as biodiesel. These impurities include, but are not limited to, alcohol, glycerin, soaps, residual catalysts, metals, free fatty acids, sterol glycosides as well as other impurities that reduce the stability of biodiesel. Therefore, at this point in the process, the FAAEs cannot be commercially marketed as biodiesel until the proper specifications (e.g. ASTM D6751, EN 14214, and the like) are achieved.

In biodiesel, precipitation of solids can occur at lower temperatures. It is believed that the major impurities that contribute to this undesirable precipitation include sterol glucosides and saturated monoglycerides. This precipitation can lead to filters clogging and vehicles malfunctioning. This is a recognised problem and currently biodiesel is assessed using ASTM D7501 which is referred to as the "Cold Soak Test". Direct measurement of sterol glucosides and saturated monoglycerides tends to be difficult and expensive so the industry has opted for the performance based test D7501 that characterises the tendency of the contaminants to cause filter plugging.

An object of the present invention is the provision of a filter aid material which improves the (cold weather) performance of biodiesel by removing plant-based impurities such as sterol glucosides and/or saturated monoglycerides either partially or completely by adsorption. As used herein, "adsorption" is the tendency of molecules from an ambient fluid phase to adhere to the surface of a solid. This is not to be confused with the term "absorption," which results when molecules from an ambient fluid diffuse into a solid, as opposed to adhering to the surface of the solid.

The present inventors have surprisingly found that by using filter aid materials possessing certain surface characteristics then improved cold soak properties may be obtained.

SUMMARY OF THE INVENTION

The present invention provides a method for filtering non aqueous liquid. More specifically, and in a first aspect, the present invention provides a method for filtering a non aqueous liquid, the method comprising:
  providing a non aqueous liquid;
  filtering the non aqueous liquid through a filter aid material, wherein the filter aid material has a dispersive surface energy ($\gamma d$ 0.08) of greater than about 32.

In a second aspect, there is provided a method for filtering a non aqueous liquid, the method comprising:
  providing a non aqueous liquid;
  filtering the non aqueous liquid through a filter aid material, wherein the filter aid material has a ratio of basic surface energy:acidic surface energy ($\gamma -/\gamma +$) of greater than 1.

In a third aspect, there is provided a method for filtering a non aqueous liquid, the method comprising:

provariding a non aqueous liquid;

filtering the non aqueous liquid through a filter aid material, wherein the filter aid material comprises, consists of, or consists essentially of perlite.

The perlite may comprise, consist of, or consist essentially of expanded perlite.

The methods in accordance with the present invention are suitable for removing or adsorbing from the non aqueous liquid, plant-based impurities such as sterol glucosides and/or saturated monoglycerides.

In a fourth aspect, there is provided the use of a filter aid material for reducing the amount of precipitated or crystallised sterol glucoside and/or saturated monoglyceride in a non aqueous liquid when tested in accordance with ASTM D7501 and wherein the filter aid material is in accordance with any one of, or any combination of, the first, second or third aspects of the present invention.

In a fifth aspect, there is provided the use of a filter aid material for reducing the fuel filter blocking tendency of a non aqueous liquid, wherein the filter aid material is in accordance with any one of, or any combination of, the first, second or third aspects of the present invention. The filter aid material reduces the fuel filter blocking tendency of a non aqueous liquid by reducing and/or minimising the amount of sterol glucosides and/or saturated monoglycerides which precipitates from the non aqueous liquid and when tested in accordance with ASTM D7501. For example, the amount of sterol glucosides and/or saturated monoglycerides in the filtered non aqueous liquid (e.g. biodiesel) may be less than 10 ppm.

In a sixth aspect, there is provided a method for reducing the amount of sterol glucosides and/or saturated monoglycerides in a non aqueous liquid (e.g. biodiesel) by filtering the non aqueous liquid through a filter aid material, wherein the filter aid material is in accordance with any one of, or any combination of, the first, second or third aspects of the present invention.

For the various aspects of the invention following filtration typically the amount of sterol glucosides and/or saturated monoglycerides in a non aqueous liquid (e.g. biodiesel) may be less than about 10 ppm, for example lower than about 9 ppm, for example lower than about 8 ppm, for example lower than about 7 ppm, for example lower than about 6 ppm, or lower than 5 ppm, or lower than 4 ppm. The level of sterol glucosides and/or saturated monoglycerides in the filtered non aqueous liquid may be at least 1 ppm.

In the various aspects of the invention, the filter aid material may comprise, consist of, or consist essentially of one or more of a biogenic silica, volcanic glass, silicate, diatomaceous earth, perlite, cellulose, silica gel. For example, the filter aid material may comprise, consist of, or consist essentially of perlite, and in some examples the perlite comprises, consists of, or consists essentially of expanded perlite. The filter aid material may be present in composite or non composite form.

The non aqueous liquid may consist of, consist essentially of, or comprise biodiesel. The biodiesel may be present in combination with another liquid or liquids, for example the biodiesel may be present as a combination or mixture with non biodiesel or regular diesel (petroleum-based diesel fuel).

In the various aspects of the invention, the method(s) may include providing a non-aqueous liquid for filtering, admixing the filter aid material with the non aqueous liquid as a body feed, and filtering the non aqueous liquid through a filter structure to separate the filter aid material from the non aqueous liquid. The filter aid material is in accordance with the filter aid material for use in the various aspects of the invention. The filter structure may also comprise the filter aid material for use in accordance with the present invention. For example, the filter structure may be coated with the filter aid material prior to filtering the non aqueous liquid.

There are numerous possible advantages associated with the present invention. For example, the methods described herein may provide non aqueous liquids such as biodiesel which possess very low levels of sterol glucosides and/or saturated monoglycerides. The level of sterol glucosides and/or saturated monoglycerides in the filtered non aqueous liquid may be lower than about 10 ppm, for example lower than about 9 ppm, for example lower than about 8 ppm, for example lower than about 7 ppm, for example lower than about 6 ppm, or lower than 5 ppm, or lower than 4 ppm. The level of sterol glucosides and/or saturated monoglycerides in the filtered non aqueous liquid may be at least 1 ppm.

Other advantages provided by the present invention can include that the filtration may be carried out under reduced time or the contact time between the filter aid and the non aqueous liquid may be reduced. The temperature at which filtration is carried out in accordance with the present invention may be close to room temperature, e.g. in the range of about 20° C. to about 25° C. For example, said temperature range may be about 10° C. to about 30° C., for example about 12° C. to about 25° C., for example about 18° C. to about 24° C. The methods in accordance with the present invention typically do not require extensive heating and/or cooling which results in a more economic method and a method which is more straight-forward to undertake.

Any feature in one aspect of the invention may be applied to any other aspect or aspects of the invention, in any appropriate combination. In particular, product, device or article aspects may be applied to method and use aspects, and vice versa.

BRIEF DESCRIPTION OF THE DRAWINGS

This and other aspects of the present invention will now be described in more detail, with reference to the appended drawing(s) showing embodiments(s) of the invention.

DETAILED DESCRIPTION OF THE INVENTION

The present invention will now be described more fully hereinafter with reference to the accompanying drawings, in which currently preferred embodiments of the invention are shown. This invention may, however, be embodied in many different forms and should not be construed as limited to the embodiments set forth herein; rather, these embodiments are provided for thoroughness and completeness, and fully convey the scope of the invention to the skilled person. Like reference numerals in the drawings refer to like elements throughout.

As used herein, the terms "comprises," "comprising," or any other variation thereof are intended to cover a non-exclusive inclusion, such that a process, method, composition, article, or apparatus that comprises a list of elements does not include only those elements, but may include other elements not expressly listed or inherent to such process, method, composition, article, or apparatus. The term "exemplary" is used in the sense of "example" rather than "ideal."

As used herein, the singular forms "a," "an," and "the" include plural reference unless the context dictates otherwise. The terms "approximately" and "about" refer to being nearly the same as a referenced number or value. As used herein, the terms "approximately" and "about" may be understood to encompass ±10% of a specified amount or value.

Non Aqueous Liquid

The non aqueous liquid may be selected from a biodiesel. The non aqueous liquid may consist of, consist essentially of, or comprise a biodiesel. The biodiesel may be in a mixture with non biodiesel which may be referred to herein as regular, ordinary, or petroleum based diesel. Non aqueous liquids may include liquids comprising less than or equal to about 25 wt % of water. Some non aqueous liquids, for example, biodiesel distillation bottoms, may include water in the parts per million range (e.g. from 10 ppm to 10,000 ppm. Some liquids are water washed and may include a few percent of water by weight, for example from about 1 wt % to about 5 wt % or to about 2 wt %, about 3 wt %, or to about 4 wt %.

The term biodiesel is well understood by the skilled artisan. At least in the US, biodiesel must meet specifications for legal diesel motor fuel (ASTM D975) and the ASTM definition for biodiesel itself, which is ASTM D6751. ASTM D6751 is generally comparable to European Standard EN 14214. The technical definitions of biodiesel are set out below.

Biodiesel, n—a fuel comprised of mono-alkyl esters of long chain fatty acids derived from vegetable oils or animal fats, designated B100, and meeting the requirements of ASTM D6751.

Biodiesel Blend, n—a blend of biodiesel fuel meeting ASTM D6751 with petroleum-based diesel fuel, designated BXX, where XX represents the volume percentage of biodiesel fuel in the blend.

Biodiesel can be made through a chemical process called transesterification whereby glycerin is separated from fat or vegetable oil. The process provides methyl esters and glycerin. The methyl esters are used for making biodiesel while the glycerine may be used in a variety of other products including soap. The discussion provided herein in connection with the background of the present invention provides details relating to the preparation of biodiesel which is applicable to the present invention.

Though the methods described herein for filtering non aqueous liquids focus on biodiesel, the methods are also suitable for filtering other non aqueous liquids.

Filter Aid Material

In the various aspects of the present invention, the filter aid material may comprise, consist of, or consist essentially of one or more of a biogenic silica, volcanic glass, silicate, diatomaceous earth, perlite, cellulose, silica gel.

In one aspect, he filter aid material can be selected from perlite. The perlite may be expanded perlite or unexpanded perlite. As such, the filter aid material may comprise, consist of, or consist essentially of perlite.

The filter aid material may be in the form of a composite material or a non composite material. The filter aid material may comprise a mixture of materials. For example, the filter aid material may comprise, consist of, or consist essentially of a composite material comprising, consisting of, or consisting essentially of diatomaceous earth and silica gel. The diatomaceous earth may be coated with silica gel. There may or not be present a further material in the filter aid material, wherein the further material if present is a binder material which serves to bind the filter aid material. The filter aid material may comprise an adsorbent component and a filtration component. The binder, if present may be a different material than the adsorbent component and the filtration component and serve to bind them together.

The term biogenic silica as used herein refers to silica produced or brought about by living organisms. One example of biogenic silica is diatomite. Diatomaceous earth (DE) is formed from diatomite. Diatomite is a friable light-coloured sedimentary rock that is mainly composed of the siliceous skeletal remains of diatoms. When diatomite is crushed into a powder it is usually referred to as diatomaceous earth.

Diatomite is a sediment enriched in biogenic silica in the form of the siliceous frustules (i.e., shells or skeletons) of diatoms. Diatoms are a diverse array of microscopic, single-celled algae of the class Bacillariophyceae, which possess ornate siliceous skeletons or frustules of varied and intricate structure including two valves which, in the living diatom, fit together much like a pill box. Diatomite may form from the remains of water-borne diatoms and, therefore, diatomite deposits may be found close to either current or former bodies of water. Those deposits are generally divided into two categories based on source: freshwater and saltwater. Freshwater diatomite is generally mined from dry lakebeds and may be characterized as having a low crystalline silica content and a high iron content. In contrast, saltwater diatomite is generally extracted from oceanic areas and may be characterized as having a high crystalline silica content and a low iron content. The morphology of the diatom frustules may vary widely among species and serves as the basis for taxonomic classification; at least 2,000 distinct species are known. The surface of each valve is punctuated by a series of openings that include the complex fine structure of the frustule and impart a design that is distinctive to individual species. The size of typical frustules may be in a range from about 0.75 µm to about 1,000 µm. The size of the frustules may be in a range from about 10 µm to about 150 µm. The frustules in this size range may be sufficiently durable to retain much of their porous and intricate structure virtually intact through long periods of geologic time when preserved in conditions that maintain chemical equilibrium.

For use in the present invention the diatomite or diatomaceous earth may be uncalcined or calcined. Optionally, the diatomite or diatomaceous earth is calcined. If calcined, the diatomaceous earth may be flux calcined or non flux calcined.

Calcination may be conducted according to any appropriate process now known to the skilled artisan or hereafter discovered. In some embodiments, calcination is conducted at temperatures below the melting point of the filter aid material. In some embodiments, calcination is conducted at a temperature ranging from about 600° C. to about 1100° C. In some embodiments, the calcination temperature ranges from about 600° C. to about 700° C. In some embodiments, the calcination temperature ranges from about 700° C. to about 800° C. In some embodiments, the calcination temperature ranges from about 800° C. to about 900° C. In some embodiments, the calcination temperature is chosen from the group consisting of about 600° C., about 700° C., about 800° C., about 900° C., about 1000° C., and about 1100° C.

Flux calcination includes conducting at least one calcination in the presence of at least one fluxing agent. Flux calcination may be conducted according to any appropriate process now known to the skilled artisan or hereafter discovered. In some embodiments, the at least one fluxing agent is any material now known to the skilled artisan or hereafter discovered that may act as a fluxing agent. In some embodiments, the at least one fluxing agent is a salt including at least one alkali metal. In some embodiments, the at least one fluxing agent is chosen from the group consisting of carbonate, silicate, chloride, and hydroxide salts. In other embodiments, the at least one fluxing agent is chosen from the group consisting of sodium, potassium, rubidium, and cesium salts. In still further embodiments, the at least one fluxing agent is chosen from the group consisting of sodium, potassium, rubidium, and cesium carbonate salts.

Other sources of biogenic silica include plants, animals, and microorganisms, which may provide concentrated sources of silica with unique characteristics. For example, rice hulls contain sufficient silica that they can be commercially ashed for their siliceous residue, a product commonly known as "rice hull ash." Certain sponges are also concentrated sources of silica, the remnants of which may be found in geologic deposits as acicular spicules.

The term "volcanic glass," as used herein, refers to glasses that are formed by the rapid cooling of siliceous magma or lava. Several types of volcanic glasses are known, including, for example, perlite, pumice, pumicite, obsidian, and pitchstone. Volcanic glasses, such as perlite and pumice, occur in massive deposits and find wide commercial use. Volcanic ash, often referred to as "tuff" when in consolidated form, includes small particles or fragments that may be in glassy form. As used herein, the term "volcanic glass" also encompasses volcanic ash.

Volcanic glasses may be chemically equivalent to rhyolite. Volcanic glasses that are chemically equivalent to trachyte, dacite, andesite, latite, and basalt are also known, but may be less common. The term "obsidian" is generally applied to large numbers of volcanic glasses that are rich in silica. Obsidian glasses may be classified into subcategories according to their silica content, with rhyolitic obsidians (containing typically about 73% $SiO_2$ by weight) being the most common.

Perlite is a hydrated volcanic glass that may contain, for example, about 72% to about 75% $SiO_2$ by weight, about 12% to about 14% $Al_2O_3$ by weight, about 0.5% to about 2% $Fe_2O_3$ by weight, about 3% to about 5% $Na_2O$ by weight, about 4 to about 5% $K_2O$ by weight, about 0.4% to about 1.5% $CaO$ by weight, and small amounts of other metallic elements.

Perlite may be distinguished from other volcanic glasses by a higher content (such as about 2% to about 5% by weight) of chemically-bonded water, the presence of a vitreous, pearly luster, and characteristic concentric or arcuate onion skin-like (i.e., perlitic) fractures. Perlite products may be prepared by milling and thermal expansion, and may possess unique physical properties such as high porosity, low bulk density, and chemical inertness. "Perlite," as used herein, also includes expanded perlite. The perlite may be unexpanded or expanded perlite or may comprise both unexpanded and expanded perlite.

Perlite for use in the present invention may be obtained from a perlite source material, e.g. raw perlite ore.

Suitable process conditions for preparing expanded perlite are disclosed in US Patent Application Publication No. 2006/0075930, the entire contents of which are hereby incorporated by reference. Generally, the expanded perlite employed in the present invention can be prepared by methods which include crushing, grinding, milling screening and thermal expansion. For example, perlite ore is crushed, ground and separated to a predetermined particle size range. The separated material can then be heated in air, typically at a temperature of 870-1100° C. The expanded perlite can be prepared using conventional crushing, grinding and milling techniques, and can be separated to meet particle size requirements using conventional separating techniques.

The expanded perlite may be classified, e.g., to provide a desired particle size distribution. For example, the expanded perlite (milled or unmilled) may be classified by air classification apparatus such as cyclone separators, e.g., to remove particles of a certain diameter. Screening may be used to determine the particle size distribution and the fine particulate fraction optionally removed, e.g., prior to using the expanded perlite for filtration. Screening refers to separating a particulate material into multiple particle size fractions using one or more sieves with specific mesh sizes. Thus, the particle size distribution of a given material may be expressed in terms of the percentage of the particles (by weight) in the material having a size that is greater or less than the mesh size. The expanded perlite may possess a particle size referred to herein. For example, the expanded perlite may possess a median particle size ($d_{50}$) of about 30 µm to about 50 µm.

A method of preparing the perlite for use as a filter aid material may comprise dehydrating a glassy mineral, e.g., perlite source material, e.g., raw perlite ore.

Dehydration may be achieved by heating the perlite source material, for example, and/or by exposing the perlite source material to a reduced pressure environment in order to reduce the water content. Suitable process conditions for preparing dehydrated expanded perlite are disclosed in WO 2019/046499 A1, the entire contents of which are hereby incorporated by reference.

"Cellulose is one of the most abundant biomaterials on the earth. It is generally synthesized by plants, but it is also produced by some bacteria. Like starch, cellulose is a homopolymer of glucose, and yet unlike starch, glucose monomers are joined by β-1,4 linkages. Cellulose, a tough, fibrous, and water-insoluble polysaccharide, plays an integral role in keeping the structure of plant cell walls stable. Cellulose chains are arranged in microfibrils or bundles of polysaccharide that are arranged in fibrils (bundles of microfibrils), which in turn make up the plant cell wall. This arrangement not only aids in the stability of plant structures but also suggests that cellulose is a biomaterial with high strength and other superior mechanical properties." Török, Béla, and Timothy Dransfield. Green Chemistry: an Inclusive Approach. Elsevier, 2018.

Cellulose "is a very widely used medium, made by dispersing fibres into a suspension in water. This suspension is then filtered into a mat form, which is compressed and dried. By varying the process, different porosities are achieved. The size of the fibre is important. Cellulose fibres are relatively coarse while glass is finer. Cellulose-based papers have poorer retentive power and are widely used in industrial liquid filtration applications because of lower cost and good mechanical properties. Glass is typically used in laboratory applications.

Both glass and cellulose papers can be impregnated with bonding agents such as melamine, resin and neoprene to increase strength and to modify filtration characteristics. Silicon is also used to give water repellancy for coalescer and separation applications. A very popular end-use for filter paper is for pleated cartridges in automotive and industrial applications where the micron range is from 0.5 to 500 ~tm. Filter paper is also used on plate and frame presses and pressure leaf presses. Because of its weakness, paper is usually supported by perforated metal, woven wire or synthetic cloth." Svarovski, Ladislav. Solid-Liquid Separation. Butterworth-Heinemann, 2000.

The filter aid material may comprise, consist of, or consist essentially of a composite filter aid material. The filter aid material may therefore be referred to herein as a composite filter aid material. As used herein, the term "composite filter aid" may refer to a material having a substrate such as a silicate substrate and a material precipitated thereon. For example, the composite filter aid material may comprise, consist of, or consist essentially of a composite of diatomaceous earth and a silica such as silica gel. The silica, e.g. silica gel may be coated or precipitated onto the surface of the silicate (e.g. diatomaceous earth) substrate. The silica, e.g. silica gel may be coated or precipitated onto a part of, or substantially the entirety of, or the entirety of the surface of the silicate (e.g. diatomaceous earth) substrate. The silicate (e.g. diatomaceous earth) substrate may act as a filtration component while the precipitated silica (e.g. silica gel) may act as an adsorbent component. The composite filter aid may have different properties from either constituent substrate or the material precipitated thereon alone.

To prepare composite filter aid material which is suitable for use in the present invention, a silicate substrate, such as, for example, diatomite, biogenic silica, or volcanic glass (e.g. perlite), can be mixed with water to form a suspension. The substrate may be a commercially-available filtration component of diatomite or perlite. Suitable commercially available diatomite includes for example, Celite Standard Super Cel®, manufactured by Imerys. The substrate may be a commercially-available filtration component selected from the group including Celite 3Z®, Celite 577®, Celite 289®, Celite 512°, Celite 535®, Celite 545®, Celite Filter-Cel®, and Celite Hyflo Super-Cel®, all manufactured by Imerys. The substrate may be a commercially available component selected from the group generally referred to as Harborlite®. A particular example ifs Harborlite® 900 which is also commercially available from Imerys.

The precipitated silica may include a precipitated silica gel that is precipitated on the silicate substrate. The precipitated silica may be an amorphous silica.

A sodium silicate solution may then added to the substrate suspension, which raises the pH. The weight ratio of sodium silicate to the substrate may be, for example, about 1:3, but any suitable ratio may be used. The sodium silicate may include any one of several compounds that includes sodium oxide ($Na_2O$) and silica ($SiO_2$). Such combinations may include, for example, sodium ortho silicate ($Na_4SiO_4$), sodium meta silicate ($Na_2SiO_3$), and sodium disilicate ($Na_2Si_2O_5$). In some embodiments, the sodium silicate is a diatomite-based sodium silicate. Sodium silicate with a $SiO_2/Na_2O$ ratio of about 3.2:1 and a concentration of 20% may be purchased, for example, from Imerys. Sodium silicate with a $SiO_2/Na_2O$ ratio of about 3:1 and a concentration of 34.6% may be purchased, for example, from PQ Corp.

An acid, or a salt thereof, may then be added to the slurry in an amount sufficient to increase the acidity (i.e., reduce the pH) of the slurry to a pH range suitable for the precipitation of silica onto the surface of the substrate. Any suitable acid may be selected, such selection being within the know-how of one skilled in the art. The acid may include one or more of sulfuric acid, phosphoric acid, hydrochloric acid, nitric acid, and/or acetic acid. The precipitated silicate may form a coating (e.g., layer) on the substrate's surface.

As the pH lowers, the slurry may be stirred periodically. According to some embodiments, the stirring may continue until gelling of the silica occurs, which may form a coating on the substrate. According to some embodiments, stirring may occur for about 25 to about 60 minutes, depending upon the acidity of the solution and the sodium silicate concentration in the slurry. The slurry may then be filtered and water may be added to the suspension to aid filtration. The resulting cake may be washed with water. The washed cake may then be dried until the excess fluid in the cake has evaporated. For example, the cake may be dried at a temperature ranging from about 110° C. to about 200° C. The resulting cake includes a silicate filtration component, such as, for example, diatomite (or diatomaceous earth), having a precipitated silica coating.

The precipitated silica may include a co-gel. For example, magnesium sulfate, sodium aluminate, or both, may be added to a sodium silicate solution that forms the precipitated silica or precipitated silica gel. The addition of the sulfate or aluminate may form a silicate structure with the precipitated silicate. When the precipitated silicate is a gel, such as a silica gel, the addition of the sulfate or sodium aluminate may form a co-gel.

The filter aid materials disclosed herein have a particle size. Particle size may be measured by any appropriate measurement technique now known to the skilled artisan or hereafter discovered. In one exemplary method, particle size and particle size properties, such as particle size distribution ("psd"), are measured using a Leeds and Northrup Microtrac X100 laser particle size analyzer (Leeds and Northrup, North Wales, Pennsylvania, USA). The size of a given particle is expressed in terms of the diameter of a sphere of equivalent diameter that sediments through the suspension, also known as an equivalent spherical diameter or "esd." The median particle size, or $d_{50}$ value, is the value at which 50% by weight of the particles have an esd less than that $d_{50}$ value. The $d_{10}$ value is the value at which 10% by weight of the particles have an esd less than that $d_{10}$ value. The $d_{90}$ value is the value at which 90% by weight of the particles have an esd less than that $d_{90}$ value.

The filter aid material may have a median particle size ($d_{50}$) in a range from about 1 to about 300 μm, such as, for example, from about 40 to about 300 μm, from about 40 to about 250 μm, from about 100 to about 250 μm, from about 5 to about 150 μm, from about 40 to about 140 μm, from about 60 to about 120 μm, from about 20 to about 50 μm, from about 30 to about 50 μm, from about 30 to about 60 μm, from about 60 to about 90 μm, from about 90 to about 120 μm, from about 120 μm to about 150 μm, from about 1 to about 40 μm, from about 10 to about 40 μm, from about 10 to about 30 μm, or from about 15 to about 25 μm.

The filter aid material may have a $d_{90}$ in a range from about 50 to about 700 μm, such as, for example, from about 300 to about 700 μm, from about 300 to about 500 μm, from about 100 to about 300 μm, from about 200 to about 400 μm, from about 50 to about 300 μm, from about 100 to about 200 μm, from about 200 to about 300 μm, from about 50 to about 100 μm, from about 60 to about 140 μm, from about 70 to about 120 μm, or from about 80 to about 110 μm.

The filter aid material may have a $d_{10}$ in a range from about 1 to about 30 μm, such as, for example, from about 1 to about 10 μm, from about 10 to about 20 μm, from about 20 to about 30 μm, from about 5 to about 15 μm, from about 15 to about 25 μm, from about 20 to about 25 μm, from about 2 to about 20 μm, from about 3 to about 15 μm, from about 4 to about 12 μm, from about 5 to about 10 μm, from about 1 to about 5 μm, or from about 1 to about 3 μm.

The values given for the $d_{10}$, $d_{50}$ and $d_{90}$ either considered individually or in any combination are applicable to each of the filter aid materials mentioned herein. Each of the specific values or ranges of values may be applied to any one of biogenic silica, volcanic glass, silicate, diatomaceous earth, perlite, (including expanded or unexpanded), cellulose, silica gel.

The filter aid material may have a permeability in a range from about 50 to about 5000 millidarcies ("md"). For example, the filter aid material may have a permeability in a range from about 50 to about 2000 md, from about 50 to about 1000 md, from about 50 to about 500 md, from about 50 to about 300 md, from about 50 to about 200 md, from about 50 to about 100 md, from about 100 to about 400 md, from about 100 to about 300 md, from about 100 to about 200 md, from about 200 to about 300 md, from about 100 to about 4000 md, from about 100 to about 3000 md, from about 500 to about 3000 md, from about 500 to about 1500 md, from about 1500 to about 3000 md, from about 200 to about 2000 md, from about 200 to about 1000 md, from about 200 to about 500 md, from about 500 to about 1000 md, from about 1000 to about 1500 md, from about 1500 to about 2000 md, from about 2000 to about 2500 md, from about 2500 to about 3000 md, or from about 1000 to about 2000 md. Permeability may be measured by any appropriate measurement technique now known to the skilled artisan or hereafter discovered. Permeability is generally measured in darcy units or darcy, as determined by the permeability of a porous bed 1 cm high and with a 1 cm$^2$ section through which flows a fluid (e.g. water) with a viscosity of 1 mPa·s with a flow rate of 1 cm$^3$/sec under an applied pressure differential of 1 atmosphere and at 20° C. The principles for measuring permeability have been previously derived for porous media from Darcy's law (see, for example, J. Bear, "The Equation of Motion of a Homogeneous Fluid: Derivations of Darcy's Law," in Dynamics of Fluids in Porous Media 161-177 (2nd ed. 1988)). An array of devices and methods are in existence that may correlate with permeability. In one exemplary method useful for measuring permeability, a specially constructed device is designed to form a filter cake on a septum from a suspension of filtration media in water; and the time required for a specified volume of water to flow through a measured thickness of filter cake of known cross-sectional area is measured. Each of the specific values or ranges of values may be applied to any one of biogenic silica, volcanic glass, silicate, diatomaceous earth, perlite, (including expanded or unexpanded), cellulose, silica gel.

As used herein, "surface area" refers to a BET surface area. "BET surface area," as used herein, refers to the technique for calculating specific surface area of physical absorption molecules according to Brunauer, Emmett, and Teller ("BET") theory. BET surface area can be measured with a Gemini III 2375 Surface Area Analyzer, using nitrogen as the sorbent gas, or ASAP® 2460 Surface Area and Porosimetry Analyzer, available from Micromeritics Instrument Corporation (Norcross, Ga., USA). The filter aid materials may have a BET surface area in a range from about 0.5 m$^2$/g or from about 1 m$^2$/g or from about 5 m$^2$/g or from about 10 m$^2$/g, or from about 25 m$^2$/g to 440 m$^2$/g. For example, the filter aid materials may have a BET surface area in a range from about 50 m$^2$/g to about 300 m$^2$/g, from about 50 m$^2$/g to about 200 m$^2$/g, from about 50 m$^2$/g to about 150 m$^2$/g, from about 100 m$^2$/g to about 200 m$^2$/g, or from about 100 m$^2$/g to about 150 m$^2$/g. Each of the specific values or ranges of values may be applied to any one of biogenic silica, volcanic glass, silicate, diatomaceous earth, perlite, (including expanded or unexpanded), cellulose, silica gel.

According to some embodiments, the filter aid material may have a wet density in a range from about 5 lbs/ft$^3$ or from about 10 lbs/ft$^3$ to about 40 lbs/ft$^3$. For example, the filter aid material may have a wet density in a range from about 5 lbs/ft$^3$ or from about 10 lbs/ft$^3$ to about 20 lbs/ft$^3$, from about 5 lbs/ft$^3$ or from about 10 lbs/ft$^3$ to about 15 lbs/ft$^3$, from about 20 lbs/ft$^3$ to about 30 lbs/ft$^3$, from about 15 lbs/ft$^3$ to about 25 lbs/ft$^3$, from about 25 lbs/ft$^3$ to about 35 lbs/ft$^3$, from about 15 lbs/ft$^3$ to about 20 lbs/ft$^3$, from about 20 lbs/ft$^3$ to about 25 lbs/ft$^3$, or from about 25 lbs/ft$^3$ to about 30 lbs/ft$^3$. Each of the specific values or ranges of values may be applied to any one of biogenic silica, volcanic glass, silicate, diatomaceous earth, perlite, (including expanded or unexpanded), cellulose, silica gel.

"Wet density" is an indicator of a material's porosity. For example, wet density reflects the void volume available to entrap particulate matter in a filtration process and, consequently, wet density may be used to determine filtration efficiency. Wet density also indicates the percent porosity of a material, which may be expressed by the following formula:

$$\text{Porosity}=100*[1-(wet\text{ density/true density})]$$

Thus, filter aid materials or, for example, filtration components with lower wet densities may result in products with greater porosity, and thus perhaps greater filtration efficiency, provided that the true density stays relatively constant. Given that wet density reflects the void volume of the adsorbent component to entrap matter in the filtration process, a lower wet density may indicate that the adsorbent component has a high void volume and thus can adsorb more particles and/or constituents in the fluid.

According to one exemplary method, to measure wet density, a material sample of known weight from about 1.00 to about 2.00 g is placed in a calibrated 15 ml centrifuge tube. Deionized water is then added to make up a volume of approximately 10 ml. The mixture is shaken thoroughly until all of the sample is wetted, and no powder remains. Additional deionized water is added around the top of the centrifuge tube to rinse down any mixture adhering to the side of the tube due to shaking. The tube is then centrifuged for 5 minutes at 2500 rpm on an IEC Centra® MP-4R centrifuge, equipped with a Model 221 swinging bucket rotor (International Equipment Company; Needham Heights, Massachusetts, USA). Following centrifugation, the tube is carefully removed without disturbing the solids, and the level (i.e., volume) of the settled matter is measured in cm$^3$. The centrifuged wet density of powder can be calculated by dividing the sample weight by the measured volume.

Surface Energy

The surface energy of the filter aid material may be measured using known techniques. In accordance with the present invention, the surface energy may be measured using an inverse gas chromatography surface energy analyser (iGC-SEA) as supplied by Surface Measurement Systems, headquarters at Alperton, London, HA0 4PE, UK. The operation of the iGC-SEA is based on Inverse Gas Chromatography (IGC) methodology and is a gas phase technique for characterising surface and bulk properties of solid materials. In essence, the measurement is the reverse of a conventional gas chromatographic (GC) experiment. A cylindrical column is uniformly packed with the solid material of interest, which for the purposes of the present invention is typically in powder form. A pulse of constant concentration of gas is then injected down the column at a fixed carrier gas flow rate, and the time taken for the pulse or concentration front to elute down the column is measured by a detector. A series of IGC measurements with different gas phase probe molecules then allows access to a wide range of physico-chemical properties of the solid sample. The injected gas molecules pass over the material and adsorb on the surface with a partition coefficient Ks:

$$Ks=Vn/Ws$$

wherein Vn is the net retention volume which is the volume of the carrier gas required to elute the injection through the column, and Ws is the mass of the sample. Vn is a measure of how strongly the probe gas interacts with the solid sample and is considered the fundamental data obtained from an IGC experiment which allows for a range of surface and bulk properties to be calculated. With regard to the notation γd 0.16, γd 0.08, γd 0.0016, the number after the value of gamma (γ) indicates the surface coverage by the gas. Hence γd 0.16 indicates that 16% (by volume) of the surface is covered with gas, γd 0.08 indicates that 8% (by volume) of the surface is covered with gas, γd 0.0016 indicates that 1.6% (by volume) of the surface is covered with gas.

For example, in order to measure the surface energy on an iGC-SEA and in accordance with the present invention the following steps may be undertaken.

1. The BET surface area of the sample of filter aid material is measured. As used herein, "surface area" refers to a BET surface area. "BET surface area," as used herein, refers to the technique for calculating specific surface area of physical absorption molecules according to Brunauer, Emmett, and Teller ("BET") theory. BET surface area can be measured with a Gemini III 2375 Surface Area Analyzer, using nitrogen as the sorbent gas, or ASAP® 2460 Surface Area and Porosimetry Analyzer, available from Micromeritics Instrument Corporation (Norcross, Ga., USA).

2. An amount of the filter aid material is packed into a glass cylindrical column. The amount of material loaded into the column should be to a packing height of about 7 mm in a column possessing a 2 mm internal diameter, or should possess a BET surface area of about 0.5 m². The surface area measurement is used if it results in a higher level of material in the column.

3. The column which is packed with the filter aid material is loaded into the iGC-SEA.

4. The surface energy is measured at 50° C.

5. The dispersive surface energy (γd) is measured using at least three of the following alkanes: heptane, octane, nonane, decane, and dodecance. The highest alkane(s) which provide a surface coverage of 0.16 are preferred. A low elution rate (e.g. about 7 cm³/min) is preferred. Typically, the elution rate needs to be low enough to allow an elution time of at least about 0.2 min.

6. The base type surface energy (γ−) is measured using dichloromethane ($CH_2Cl_2$). A low elution rate (e.g. about 7 cm³/min) is preferred. Typically, the elution rate needs to be low enough to allow an elution time of at least about 0.2 min.

7. The acid type surface energy (γ+) is measured using ethyl acetate ($CH_3COOC_2H_5$). A higher elution rate is used for the measurement of γ+ when compared with γ−. For example, an elution rate of 20 cm³/min or greater than 20 cm³/min is suitable and a longer experiment time (for example up to about 500 min) for low surface coverage (e.g. less than 0.05) is recommended. The elution peak may be identified from the raw data chromatogram for at least one data point with 0.01 or lower surface coverage and one data point between 0.01 and 0.05 surface coverage. It is acceptable to use manual peak identification in the data analysis software.

8. The SEA data analysis software is used to calculate the various types of surface energy, γd (0.16), γd (0.08), γd (0.0016), γ+, γ−.

Method of Filtration

The non aqueous liquid (e.g. biodiesel), may be filtered using established techniques and/or apparatus. For example, the filter aid material may be packed in a column and the non aqueous liquid filtered through either with or without the application of additional pressure. Preferably, the non aqueous liquid should be in contact with the filter aid material for at least about 10 minutes. The non aqueous liquid may in contact with the filter aid material for up to about 30 minutes. The contact time may be varied depending on the nature of the filter aid material used and in order to achieve the desired levels of sterol glucosides and/or saturated monoglycosides and/or to achieve the desired cold soak time in accordance with ASTM D7501. The temperature at which the filtration is carried out may also be controlled and/or varied. For example, the temperature may be maintained in the range of about 10° C. to about 30° C., for example about 12° C. to about 25° C., for example about 18° C. to about 24° C., or from about 20° C. to about 25° C. This time (range) and temperature (range) may be referred to herein as the "treatment time" and the "treatment temperature".

Figure 1:
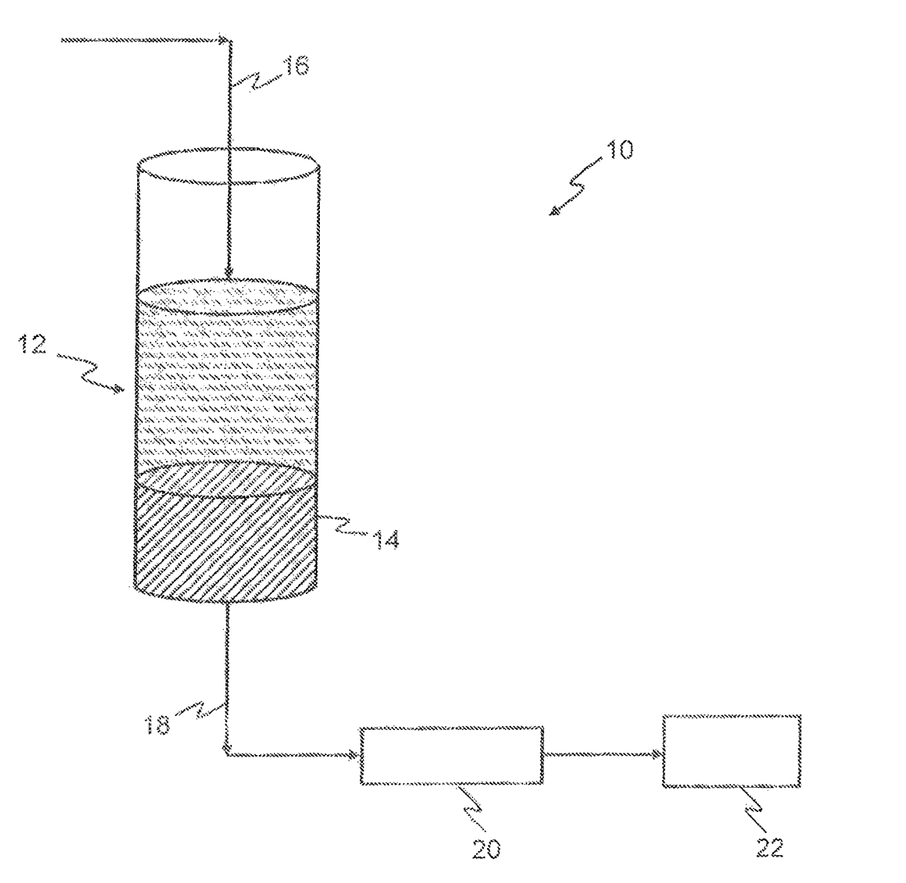
FIG. 1 shows an exemplary process flow for filtering non aqueous liquid, e.g. biodiesel (or crude FAAE).

FIG. 1 shows an exemplary process flow for a non aqueous liquid (e.g. biodiesel or FARE). FIG. 1 is a schematic diagram of biodiesel purification by a filtration system. Filtration system (10) includes an adsorption column (12) having an adsorbent material (14). Adsorbent material (14) includes a filter aid to purify biodiesel (16). Biodiesel (16) may be a crude or previously filtered biodiesel. Although FIG. 1 shows only a single adsorption column (12), it is understood that two or more adsorbtion columns may be placed in series and/or in parallel to increase the filtration rate of filtration system (10) and/or increase the purification of the filtered biodiesel. Crude biodiesel (16) may include a crude feed of fatty acid alkyl esters (FAAEs) or oils, which is contacted with a sufficient amount of adsorbent material (14) to remove impurities, such as, for example, sterol glycosides, and/or saturated monoglycerides. Other impurities may include one or more of: soaps, phosphorous-containing compounds, catalysts, metals, free glycerin, chlorophyll, free fatty acids, and other impurities that reduce the stability of biodiesel. Suitable adsorbent materials (14) include the filter aid materials described herein (e.g., perlite), which may further include additional filter aid materials). After passing through adsorbent material (14), the biodiesel is considered filtered biodiesel (18).

Purified biodiesel (18) exits adsorption column (12) and may optionally pass to an evaporator (20). Evaporator (20) may be used to recover alcohol components of purified biodiesel (18), such as methanol. The evaporator (20) may be a flash evaporator. After passing through evaporator (20), the biodiesel may undergo further processing to create a biodiesel product (22).

As biodiesel (16) passes through adsorbent material (14), impurity deposits may accumulate on adsorbent material (14), reducing the flow rate and filtration efficiency of adsorbent material (14). These combined layers of impurity and filter aid are sometimes referred to as a "filter cake." As more and more particles and/or impurities are deposited on the filter cake, the filter cake may become saturated with debris to the point where fluid is no longer able to pass through at an acceptable rate. To help alleviate this problem, additional filter aid material may be introduced by "body feeding." Body feeding is the process of introducing additional filter aid material into the fluid to be filtered before the fluid reaches the filter cake, such as before biodiesel (16) contacts adsorbent material (14). The filter aid material follows the path of the unfiltered fluid and, upon reaching adsorbent material (14), the added filter-aid material will bind to or settle on the filter cake. These additional layers of filter aid material cause the filter cake to swell and thicken and increases the capacity of the cake to entrap additional debris and impurities. Body feeding may also help the filter aid material maintain an open structure in the filter cake, which may help to maintain permeability and flow rate of the filter cake.

The filter aid materials may be used in a variety of filtration processes and compositions. A filter element may be used to support the filter aid material. The filter element may contain filter element voids through which fluid may flow. The filter aid material may be applied to a filter septum to protect it and/or to improve clarity of the liquid to be filtered in a filtration process. The filter aid material may be added directly to the fluid, such as a non-aqueous fluid (e.g., biodiesel) to be filtered to increase flow rate and/or extend the filtration cycle. The filter aid material may be used as pre-coating layer for a filter element, in body feeding to help improve the usable life of a filter cake and/or to maintain flow properties through the filter, or a combination of both pre-coating and body feeding, in a filtration process.

The filter aid material may also be used in a variety of filtering methods. The filtering method may include pre-coating at least one filter element with the filter aid material, and contacting at least one liquid to be filtered with the at least one coated filter element. In such embodiments, the contacting may include passing the liquid through the filter element. In some embodiments, the filtering method includes suspending the filter aid material in the liquid to be filtered, and thereafter separating the filter aid material from the filtered liquid.

Following filtration, the amounts of sterol glucoside and and/or saturated monoglycerides in a non aqueous liquid (e.g. biodiesel) may be less than about 10 ppm, for example lower than about 9 ppm, for example lower than about 8 ppm, for example lower than about 7 ppm, for example lower than about 6 ppm, or lower than 5 ppm, or lower than 4 ppm. The level of sterol glucosides and/or saturated monoglycerides in the filtered non aqueous liquid may be at least 1 ppm.

The levels of sterol glucoside and and/or saturated monoglycerides in the non aqueous liquid may be measured by ASTM D6584.

EXAMPLES

The invention will now be described, by way of example only and without limitation, with reference to the following Examples. Reference may be made to the sample, material, filter aid material or the adsorbent, which for the purposes of the Examples section relate to the same feature.

Test Methods and Samples

Details relating to the filter aid materials tested are set out in Table 1. All of the materials were commercially available.

Details relating to the filtration of the non aqueous liquid and the subsequent cold soak test (ASTM D7510) are set out below.

The dosages (wt %) are with respect to the total weight of the non aqueous liquid and added filter aid material.

In the following examples, filter aid material and biodiesel were mixed for a specified "treatment time" and at a "treatment temperature". In Table 5, the time taken to filter the mixture is reported in the column headed "400 ml filter time after cold treatment".

Filtration of the Non Aqueous Liquid

In accordance with the present invention, the non aqueous liquid was filtered using the filter aid material. The samples were filtered in accordance with the following procedure.

1. A flask containing 400 ml of non aqueous liquid (biodiesel) was placed into a reservoir of water maintained at a target temperature and the non aqueous liquid in the flask was left to acquire the temperature of the water. A weight was used to steady the flask of non aqueous liquid.

2. An agitator was placed in the flask and the non aqueous liquid agitated using a PTFE impeller at 300 RPM. The temperature of the non aqueous liquid was recorded with a thermometer to check it was at the desired temperature (the "filter temperature").

3. Once the non aqueous liquid was at the desired temperature, the filter aid material was added and the mixture was stirred for about 10 minutes.

4. A 90 mm Whatman #4 paper was placed on the surface of a 600 ml Buchner filter.

5. A vacuum was generated and the combination of non aqueous liquid and filter aid material slurry was filtered.

6. The duration of the filtration was recorded (the "400 ml filter time after cold treatment").

7. 300 mL of the filtrate was set aside for the cold soak procedure (ASTM D7501) and the remaining filtrate was retained for other testing, including ICP.

Cold Soak Procedure: ASTM D7501

Following filtration, the resulting non aqueous liquid was subjected to the Cold Soak Test in accordance with ASTM D7501.

The samples were subjected to the cold soak procedure in accordance with ASTM D7501 as set out below.

1. Prior to Cold Soak testing, the sample's "thermal history" was restored. The sample was incubated at 40° C. for 3 hours and allowed to rest at room temperature (20° C.) for an additional 24 hours.

2. 300 mL of the sample was poured into a 500 mL Erlenmeyer flask and placed with a weight donut into a chiller reservoir at a temperature of 20° C. The flask was topped with Parafilm™ to prevent oxidation of the oil.

3. The filtrate was left to sit in the chiller bath for 16 hours.

4. The temperature of the chiller was set to 25° C. and the filtrate allowed to rest for a further 2 hours.

5. A glass fiber filter was assembled by placing a metal septum ring in the bottom half of the filter assembly, ensuring the surface was flush with the top. A 0.7 μm thick glass fiber filter was inserted, a funnel placed on top and clamped shut.

6. The flask was gently swirled to dislodge any particles that may have adhered to the sides. Vigorous shaking was avoided in order to avoid re-dissolving any solids present.

7. A vacuum (70-85 kPa (21-25 in-Hg)) was applied and the liquid poured in. The duration of the filtration was recorded (the "cold soak time") and was complete when the surface of the paper was dry. To "pass" the test the time should be less than 360 seconds. A premium grade of biodiesel, called 1-B corresponds to a filtration time of 200 seconds or less and a concentration of monoglycerides of 0.4 wt % or less.

TABLE 1

Materials tested

| Material ref no | Available from | Type of Material | $D_{50}$/ μm | SA/ m²/g | Wet density/ g/L |
|---|---|---|---|---|---|
| 1 | Imerys | Composite of DE and Magnesium silicate | 45 | 200 | 360 |
| 2 | Imerys | Composite of DE silica gel and citric acid | 45 | 100 | 455 |
| 3 | Imerys | Cellulose | 35 | 0.93 | 320 |
| 4 | Imerys | Diatomaceous earth (DE) | 23.5 | 4.28 | 366 |
| 5 | Imerys | Expanded milled perlite | 35.8 | 1.08 | 210 |
| 6 | Imerys | Composite of DE and silica gel | 45 | 140 | 360 |
| 7 | Imerys | Composite of DE and silica gel | 20.9 | 65 | 360 |
| 8 | Dallas Group | Magnesium Silicate | 95 | 383 | 400 |
| 9 | Imerys | Expanded milled perlite | 34.1 | 1.4 | 280 |

Example 1

A number of adsorbents were tested in the cold soak procedure. The biodiesel tested was a corn based Biodiesel and is referred to herein as Biodiesel A. The results are presented in Table 2.

TABLE 2

ASTM D7501 cold soak results

| Material | Dosage/ wt % | Filter temp/ ° C. (° F.) | Cold soak time/s |
|---|---|---|---|
| None | None | unfiltered | 18,000 |
| 4 | 0.4 | 18.3 (65) | 578 |
| 5 | 0.4 | 18.3 (65) | 100 |
| 7 | 0.4 | 18.3 (65) | 93 |

Example 2

A number of adsorbents were tested in the cold soak procedure. The biodiesel tested was a soy based Biodiesel and is referred to herein as Biodiesel B. The results are presented in Table 3.

TABLE 3

ASTM D7501 cold soak results

| Material | Material Dosage/wt % | DE dosage/ wt % | Filter temp/ ° C. (° F.) | Cold soak time/s |
|---|---|---|---|---|
| None | None | None | Unfiltered | 560 |
| 6 | 0.15 | 0.20 | 17.2 (63) | 82 |
| 8 | 0.15 | 0.20 | 17.2 (63) | 121 |

Example 3

A number of adsorbents were tested in the cold soak procedure. The biodiesel tested was a soy based Biodiesel and is referred to herein as Biodiesel C. TSG is the total sterol glucoside present in ppm and is measured by gas chromatography, ASTM D6584. The results are presented in Table 4.

TABLE 4

ASTM D7501 cold soak results

| Material | Dosage/ wt % | Filter Temp/ ° C. (° F.) | Cold soak time/s | TSG/ ppm |
|---|---|---|---|---|
| None | None | Unfiltered | 290 | |
| Filter Paper | None | 18.3 (65) | 180 | 8.6 |
| 5 | 0.4 | 12.8 (55) | 79 | 4.7 |
| 6 | 0.4 | 12.8 (55) | 74 | 3.7 |
| 5 | 0.4 | 23.9 (75) | 109 | 5.3 |
| 6 | 0.4 | 23.9 (75) | 86 | 6.5 |

Example 4

A number of adsorbents were tested in the cold soak procedure. The biodiesel tested was a Soy Methyl Ester and is referred to herein as Biodiesel D. The results are presented in Table 5. The 400 mL filter time after cold treatment is the time taken to filter the biodiesel prior to its being tested in accordance with ASTM D7501 (cold soak time).

TABLE 5

ASTM D7501 cold soak results

| Material | Dosage/ wt % | Filter Temp/ ° C. (° F.) | Treatment time/min | Cold soak time/s | 400 mL filter time after cold treatment/ min |
|---|---|---|---|---|---|
| None | None | Unfiltered | — | 9720 | |
| Filter paper | None | 12.8 (55) | — | 293 | 10.8 |
| Filter paper | None | 23.9 (75) | — | 8160 | 10 |
| 4 | 0.4 | 12.8 (55) | 10 | 380 | 5.6 |
| 5 | 0.4 | 12.8 (55) | 10 | 242 | 4.5 |
| 6 | 0.4 | 12.8 (55) | 10 | 800 | 5.3 |
| 5 | 0.4 | 18.3 (65) | 10 | 4370 | 2.5 |
| 6 | 0.4 | 18.3 (65) | 10 | 4422 | 3.5 |
| 5 | 0.4 | 23.9 (75) | 10 | 8160 | 2.1 |
| 6 | 0.4 | 23.9 (75) | 10 | 5446 | 3.1 |
| 5 | 0.4 | 23.9 (75) | 10 | 3540 | 2.7 |
| 2 | 0.4 | 12.8 (55) | 10 | 1739 | 4.2 |
| 3 | 0.4 | 12.8 (55) | 10 | 199 | 3.7 |
| 9 | 0.4 | 12.8 (55) | 10 | 268 | 5.8 |
| 5 | 0.4 | 12.8 (55) | 30 | 83 | 3.9 |
| 4 | 0.4 | 12.8 (55) | 30 | 120 | 4.8 |
| 6 | 0.4 | 12.8 (55) | 30 | 353 | 6 |

Example 5

A number of adsorbents were tested in the cold soak procedure. The results are presented in Table 6. The biodiesel tested was a soy methyl ester and is referred to herein as Biodiesel. In Table 6 surface energy results are also provided.

TABLE 6

| Material | Cold soak Time/s | BET SA/ m²/g | y-/y+ 0.05-0.1 coverage | y- > y+ cross point | yd 0.0016 | yd 0.08 | yd 0.16 |
|---|---|---|---|---|---|---|---|
| 1 | High | >200 | 0.82 | | | | |
| 2 | 1739 | 65 | <1 | | | | |
| 3 | 199 | 0.93 | 2.56 | <0.002 | 46.00 | 39.52 | 35.38 |
| 4 | 380 | 4.28 | 1.18 | 0.09 | 43.36 | 30.95 | 24.84 |
| 5 | 242 | 1.08 | 1.12 | 0.01 | 41.69 | 33.14 | 25.86 |
| 6 | 800 | 200 | <1 | 0.11 | 58.22 | 40.05 | 39.48 |

Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

The invention claimed is:

1. A method for filtering a non aqueous liquid, the method comprising:
   providing a non aqueous liquid; and
   filtering the non aqueous liquid through a filter aid material,
   wherein the filter aid material has a dispersive surface energy (γd 0.08) of greater than about 32 and a ratio of basic surface energy: acidic surface energy (γ-/γ+) of greater than 1.

2. A method according to claim 1, wherein the filter aid material comprises one or more of a biogenic silica, volcanic glass, silicate, diatomaceous earth, perlite, cellulose, or silica gel.

3. A method according to claim 2, wherein the perlite is unexpanded perlite.

4. A method according to claim 1, wherein the filter aid material is a composite material.

5. A method according to claim 4, wherein the composite material comprises or consists of, or consists essentially of diatomaceous earth and silica gel.

6. A method according to claim 1, wherein the filter aid adsorbs sterol glucoside(s) and/or saturated monoglyceride(s) from the non aqueous liquid.

7. A method according to claim 1, wherein the non aqueous liquid comprises biodiesel.

8. A method according to claim 7, wherein the biodiesel is in accordance with ASTM D6751.

9. A method according to claim 1, wherein the non aqueous liquid is filtered at a temperature range of about 10° C. to about 30° C. or from about 12° C. to about 25° C.

10. A method according to claim 1, wherein the filter aid material is added to the non aqueous liquid as a body feed.

11. A method according to claim 2, wherein the perlite is an expanded milled perlite.

12. A method for filtering a non aqueous liquid, the method comprising:
    providing a non aqueous liquid; and
    filtering the non aqueous liquid through a filter aid material,
    wherein the filter aid material consists essentially of a perlite and has a dispersive surface energy (γd 0.08) of greater than about 32 and a ratio of basic surface energy: acidic surface energy (γ-/γ+) of greater than 1.

13. A method according to claim 12, wherein the perlite is expanded perlite.

14. A method according to claim 12, wherein the perlite is an expanded milled perlite.

15. A method according to claim 14, wherein the milled expanded perlite has a median particle size ($d_{50}$) of about 20 μm to about 50 μm.

16. A method according to claim 14, wherein the expanded milled perlite has a wet density of from about 5 lbs/ft³ to about 20 lbs/ft³.

17. A method for filtering a non aqueous liquid, the method comprising:
    providing a non aqueous liquid comprising biodiesel and a petroleum based diesel fuel; and
    filtering the non aqueous liquid through a filter aid material,
    wherein the filter aid material has a dispersive surface energy (γd 0.08) of greater than about 32.

* * * * *